Figure 1:
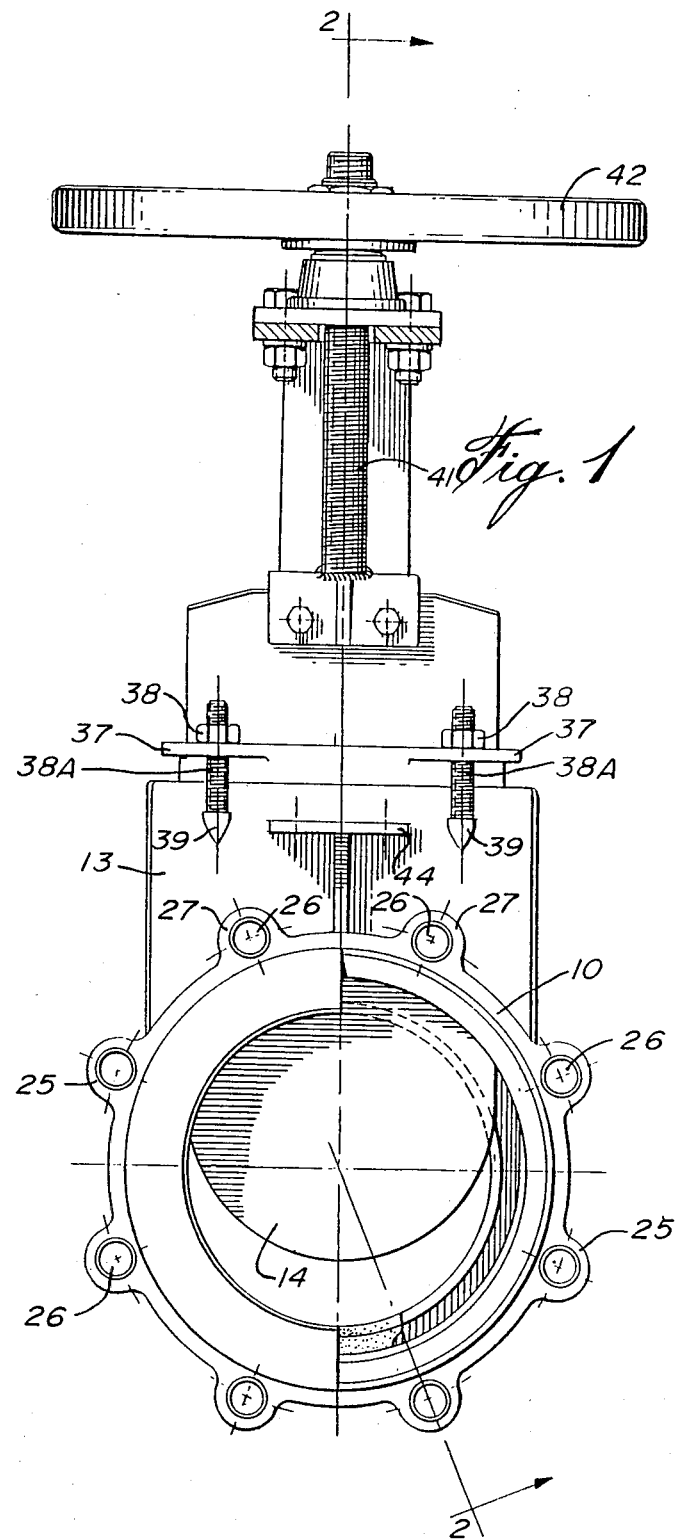

United States Patent [19]

Liberman

[11] Patent Number: 4,679,770
[45] Date of Patent: Jul. 14, 1987

[54] GATE VALVE FOR TWO WAY FLOW
[75] Inventor: Richard Liberman, Montreal, Canada
[73] Assignee: Crane Canada Inc., Montreal, Canada
[21] Appl. No.: 827,878
[22] Filed: Feb. 10, 1986
[30] Foreign Application Priority Data
May 9, 1985 [CA] Canada .................................. 481186
[51] Int. Cl.⁴ .............................................. F16K 3/02
[52] U.S. Cl. ..................................... 251/328; 251/329
[58] Field of Search ............... 251/326, 327, 328, 329, 251/334

[56] References Cited
U.S. PATENT DOCUMENTS

| | | | |
|---|---|---|---|
| 2,728,549 | 12/1955 | Smith-Peterson | 251/196 |
| 2,829,862 | 4/1958 | Wey | 251/328 |
| 3,013,770 | 12/1961 | Anderson et al. | 251/329 |
| 3,033,517 | 5/1962 | Rovang et al. | 251/328 X |
| 3,559,951 | 2/1971 | Whiteman, Jr. | 251/328 X |
| 4,377,274 | 3/1983 | Mayhew, Jr. | 251/327 |

FOREIGN PATENT DOCUMENTS 630300 11/1961 Canada .
940519 1/1974 Canada .
939658 1/1974 Canada .
1030941 5/1978 Canada .

Primary Examiner—Martin P. Schwadron
Assistant Examiner—Stephen M. Hepperle
Attorney, Agent, or Firm—Larson and Taylor

[57] ABSTRACT

A gate valve for pulp stock slurries and the like has a smooth flow passage for two way flow and has no grooves or cavities where pulp stock fibres or other particles collect. The valve comprises a rigid valve body having a flow passage with smooth curved walls therethrough, the body having a gate blade slot in the approximate center of the flow passage, a flexible resilient seat flush with the smooth curved walls, the seat being in the form of a strip extending through one end of the gate blade slot, around the flow passage and through the other end of the gate blade slot, the strip held in place by a body port insert ring attached and sealed to the valve body, and a gate blade with a semi-circular end, the gate blade adapted to fit in the gate blade slot to seal against the resilient seat.

5 Claims, 4 Drawing Figures

GATE VALVE FOR TWO WAY FLOW

The present invention relates to a gate valve for pulp stock slurries and the like. More specifically, a gates valve is provided, which has a smooth flow passage therethrough for two way flow and having no grooves or cavities where pulp stock fibers or other particles collect.

Many types of pulp stock valves have been designed and manufactured. Some of these valves are knife type gate valves wherein a knife edge on a gate blade passes in front of a seal ring. Such a valve is particularly suited for one way flow, but presents a problem with two way flow because there is invariably a cavity or groove in the flow passage for the knife edge of the gate blade that can fill up with fibers or other particles when the valve is either open or closed. Two way gate valves are available, however, in nearly all cases, the edge of the gate blade extends into a slot or groove provided in the flow passage in the body of the valve, and when the valve is open, this slot or groove acts as a cavity where fibers or other particles collect. These fibers or particles in the cavity can in some cases prevent complete closure of the valve. To overcome this problem, provision can be made for flushing these cavities, but such a design complicates the valve and often does not provide a streamline flow through the valve.

The present invention provides a gate valve having a two way flow which overcomes the problem of having grooves or slots in the flow passage of the valve body for the gate blade. Thus, no cavities are provided for fibers or other particles to collect, and a smooth streamline flow passage is provided through the valve.

The present invention provides a gate valve for two way flow comprising: a rigid valve body having a flow passage with smooth curved walls therethrough, the body having a gate blade slot in the approximate center of the flow passage, a flexible resilient seat flush with the smooth curved walls, the seat being in the form of a strip extending through one end of the gate blade slot, around the flow passage and through the other end of the gate blade slot, the strip held in place by a body port insert ring attached and sealed to the valve body and a gate blade with a semi-circular end, the gate blade adapted to fit in the gate blade slot to seal against the resilient seat.

In embodiments of the invention, the strip has a T-shaped cross section with a stem having an end face forming the resilient seat. In yet another embodiment, the body port insert ring fits into a groove in the valve body, holding the resilient seat in place and is seal welded to the valve body at the periphery of the ring.

In another embodiment, the strip forming the resilient seat extends on both sides through the gate blade slot in a portion of the valve body holding the gate blade to a packing gland, the strip on both sides providing edge seals for edges of the gate blade when in a closed position. In a still further embodiment, the strip forming the resilient seat extends on both sides through the gate blade slot and provides edge seals for edges of the gate blade, the strip at the location of the edge seals having an aperture extending down the strip on each side in line with the edges of the gate blade, and including elongated members for insertion into the apertures to expand the edge seals and provide a seal between the edges of the gate blade and the edge seals.

In yet another embodiment, the aperture extending down the strip comprises a semi-circular groove in the strip which matches with a semi-circular groove in a portion of the valve body adjacent the strip, the semi-circular groove in the portion of the valve body having a larger diameter than the semi-circular groove in the strip.

Figure 2:
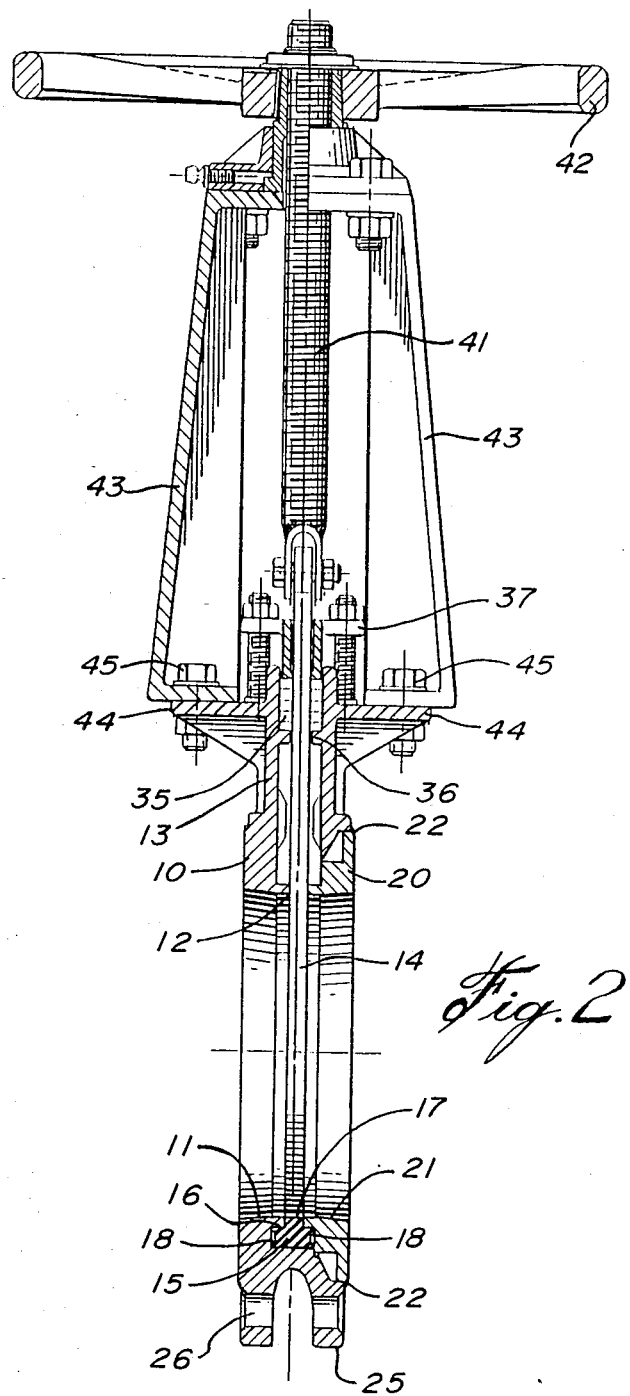
Figure 3:
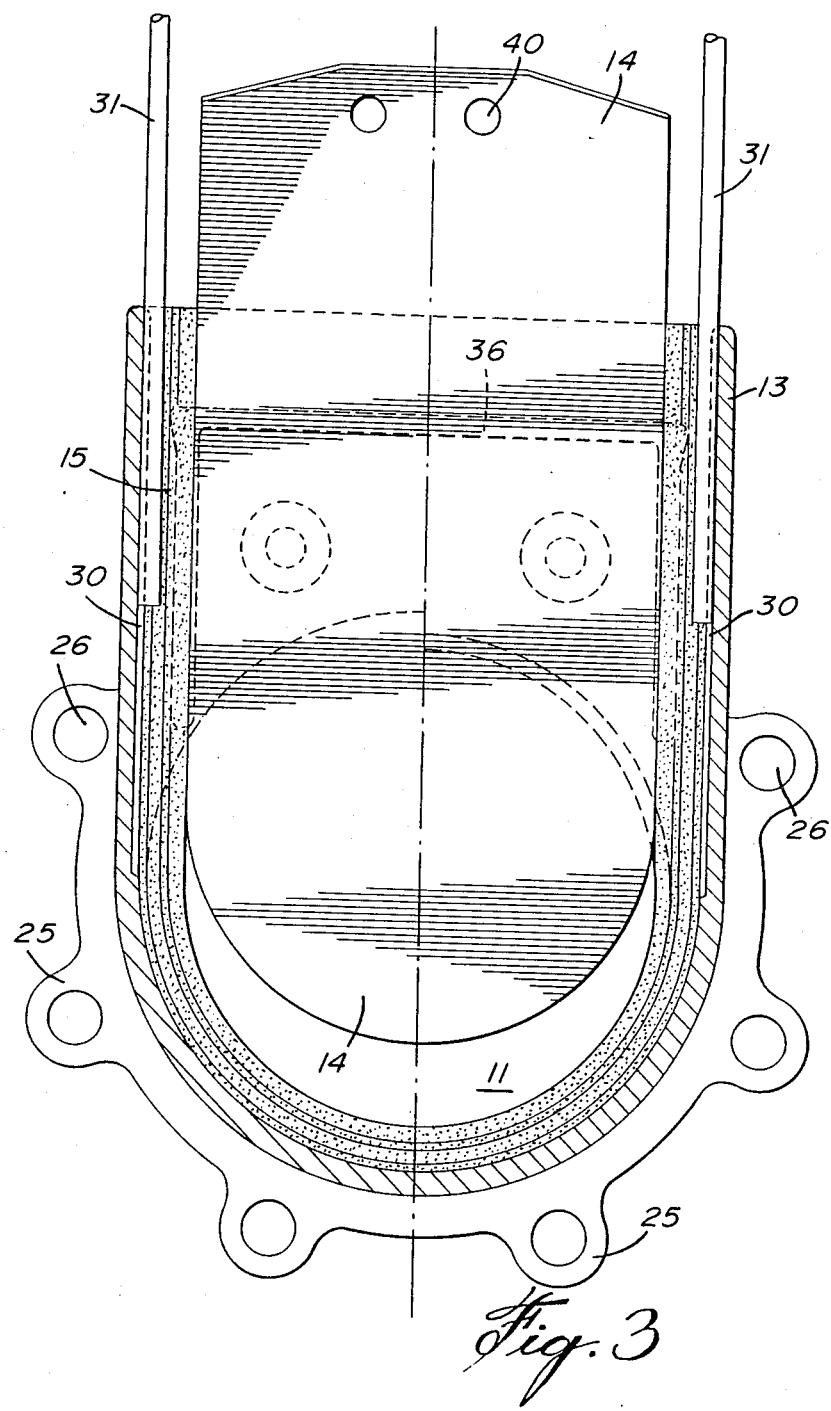
Figure 4:
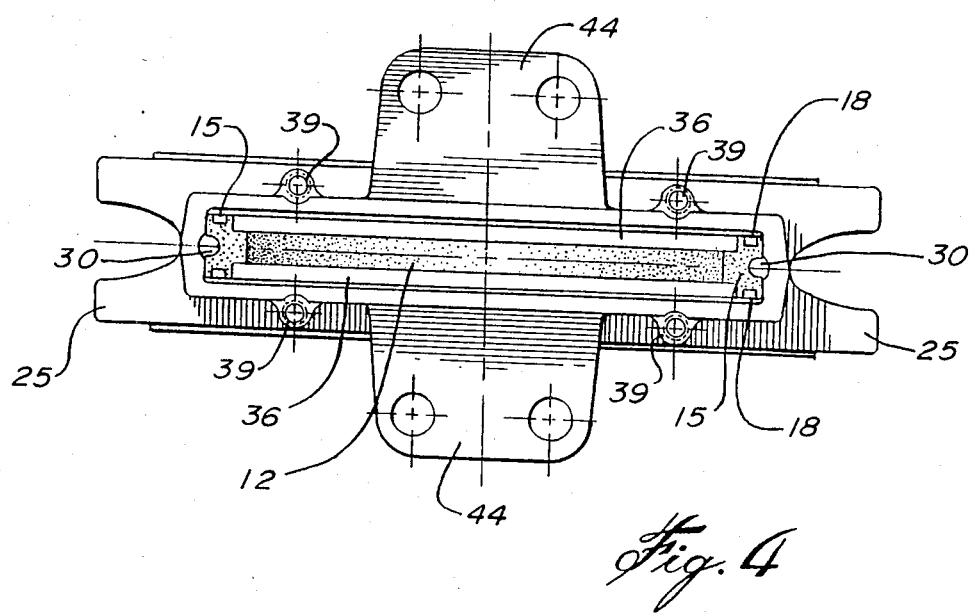

In drawings which illustrate embodiments of the invention,

FIG. 1 is an end view partly in section, of one embodiment of a gate valve according to the present invention, FIG. 2 is a cross sectional view taken at line 2—2 of FIG. 1, FIG. 3 is an end cross sectional view taken at the center of the valve shown in FIG. 1, FIG. 4 is a top view of the valve shown in FIG. 1.

Referring now to the drawings, a wafer type rigid valve body 10 has a circular flow passage 11 with smooth curved walls extending from one side of the valve body 10 to the other. A gate blade slot 12 is provided in the approximate center of the valve body 10 extending from the flow passage 11 to a gate blade housing 13 forming part of the valve body 10. The gate blade housing 13 has a substantially rectangular cross section extending from the gate blade slot 12 to provide a passage for a gate blade 14 to move in and out of the gate blade slot 12 and close the valve.

A flexible resilient seat member 15, preferably made from a suitable elastomeric material, having a substantially T-shaped cross section extending from the top of the gate blade housing 13 down one side of the housing 13, through the gate blade slot 12 around the smooth surface of the flow passage 11 to provide a seal where the gate blade 14 closes against the flow passage 11, and up through the gate blade slot 12 on the other side of the gate blade housing 13. Thus, the seat member 15 forms a sliding seal at the sides of the gate blade housing 13 for the gate blade 14 to move in and out of the gate blade slot 12, and also a seat in the flow passage 11 to allow the gate blade 14 to close and seal the valve. As can be seen in FIG. 2, the cross section of the flexible resilient seat member 15 at the bottom of the flow passage 11, opposite the gate blade slot 12, has a T-shaped section with a stem 16 having an end face 17 which is flush with the smooth curved walls of the flow passage 11. Spaces 18 are provided at flange faces of the T-shaped section for ease of insertion, and to allow space for deformation of the resilient material. A body port insert ring 20 having a circular flow passage 21 exactly the same dimensions as the flow passage 11 of the valve body housing 10, extends on one side of the body housing 10 from the resilient seat member 15 to the face of the valve body housing 10. The body port insert ring 20 fits into a circular groove defined in the valve body housing 10 and holds the resilient seat member 15 in place. The T-shaped cross section of the seat member 15 fits into a T-shaped groove formed between the housing 10 and the insert ring 20. Thus the seat member 15 cannot come out or be removed when the insert ring 20 is in place. At the periphery of the body port insert ring 20, a V-groove 22 is formed with the housing 10 and a seal weld is provided around the periphery, not only to hold the body port insert ring in place, but also to provide a seal so that no liquid can escape between the body port insert ring 20 and the housing 10. Whereas a seal weld is shown in the embodiment, other suitable mechanical attachments such as bolts about the periphery, and a suitable gasket seal may also be used to hold the body insert ring 20 to the housing 10. Furthermore, the body port insert ring 20 may be bonded utilizing high strength epoxy or other suitable bonding agents to attach and seal the ring in place.

The valve body housing 10 and body port insert ring 20 are preferably made of stainless steel by the investment casting technique first forming a wax mold which is then sprayed with a ceramic material. The wax is then melted and flows out leaving a ceramic mold. This casting technique provides sufficient accuracy so that practically no machining is necessary to the valve body housing or the body port insert ring 20. As shown in FIG. 1, individual flanges 25 extend out from the periphery on both sides of the housing 10, and have tapped holes 26 for connecting bolts to pipe flanges. Eight tapped holes 26 are shown evenly spaced about the central axis of the valve. Two of the holes 26 are tapped into hubs 27 on the outside surface of the gate blade housing 13.

The portions of the resilient seat member 15 that extend up on each side of the gate blade housing 13, have slots or apertures 30 in the center of the cross arm of the T-shape as shown in FIG. 4. These apertures 13 are used for insertion of an elongated member 31, preferably bar stock which expands the flexible material of the seat member 15 to ensure there is a seal fit between the sides of the gate blade 14 and the seat member 15. If wear occurs to the seat member 15, then the elongated members 31 can be removed and replaced with members having a slightly larger diameter thus ensuring there remains a good seal fit between the gate blade 14 in the housing 13. As shown in FIG. 3, the elongated members 31 are pressed into the apertures 30 in the seat members 15. A packing gland 35 as shown in FIG. 2 fits around the gate blade 14 and is pushed down against a stop 36 formed in the inside of the upper portion of the gate blade housing 13. The aperture 30 in the resilient seat member 15 is shown in FIG. 4 as a semi-circular groove in the side of the housing 13 together with an appropriate matching semi-circular groove in the resilient seat member 15. As can be seen, the diameter of the semi-circular groove in the resilient seat member 15 is less than the semi-circular groove in the housing 13 as the resilient seat member 15 deforms when an elongated member 31 is inserted. The shape of the aperture 30 may vary for different embodiments. In one application, a T-slot is provided in the resilient seat member 15 and a flat surface in the groove of the housing 13.

The packing gland 35 for the gate blade 14, extends down to a shoulder 36 within the gate blade housing 13. A stuffing box cover 37 is provided to compress the packing 35 and nuts 38 tighten on studs 38A supported by tapped holes in lugs 39, formed integral with the outside casing of the gate blade housing 13, hold the cover 37 in place.

The gate blade 14 has two attachment holes 40 to which is connected a threaded valve stem 41 with a rotating wheel handle 42 resting on a support yoke 43. Special flanges 44 at the top of the gate blade housing 13 support the yoke 43 which is attached by bolts and nuts 45.

The resilient seat member 15 is preferably formed from a suitable synthetic elastomer with a hardness that is sufficient to avoid excessive deformation when the gate blade 14 closes. The packing gland 35 for the gate blade 40 is preferably formed from Teflon strips 3/16th of an inch square. The elonagted member 31 is preferably formed from stainless steel bar stock, initially the diameter is ¼ inch and may be replaced with 5/16 inch diameter bar. The gate valve of the present invention may be made from 2 inch diameter up to at least 12 inches diameter and greater if desired. The elongated member 31 may be pushed down to the center line of the flow passage 11 through the valve or, in some cases, not so far. In some embodiments, it may be satisfactory to use a standard cross section of seat member 15 which is extruded and suitable for different size valves. The seat member 15 is cut to the desired length for the desired size valve.

The valve itself is absolutely symmetrical and has no cavities or grooves that pulp fibers or the like can collect. Furthermore, there is a smooth streamline flow through the valve with no projections occurring in the flow passage 11. As can be seen in FIG. 2, both the ports are slightly tapered inward, however, the transition between the tapered surface and horizontal surface is a smooth one.

Once the body port insert ring 20 has been welded in place, it forms an integral part of the valve body housing 10, trapping the seat member 15 in place. If the seat member 15 wears, then it can be removed by cutting out the weld at the V-groove 22 between the body port insert ring 20 and the body housing 10, removing the seat member 15 and replacing it with a new one and then welding back either the same insert or a new one.

Various changes may be made to the embodiment shown herein without departing from the scope of the present invention which is limited only by the following claims.

The embodiments of the invention in which an exclusive property or privilege is claimed are defined as follows:

1. A gate valve for two way flow comprising, a rigid valve body having a flow passage with smooth curved walls therethrough, the body having a gate blade slot in the approximate center of the flow passage, a flexible resilient seat flush with the smooth curved walls, the seat being in the form of a strip extending through one end of the gate blade slot, around the flow passage and through the other end of the gate blade slot, a body port insert ring attached and sealed to the valve body, the body port insert ring holding said resilient seat in place, a gate blade with a semicircular end, the gate blade adapted to fit in the gate blade slot to seal against the resilient seat, the strip forming the resilient seat extending on both sides through the gate blade slot and providing edge seals for edges of the gate blade, the strip at the location of the edge seals having an aperture extending down the strip on each side in line with the edges of the gate blade and elongated members for insertion into the apertures to expand the edge seals and provide a seal between the edges of the gate blade and the edge seals.

2. The gate valve according to claim 1 wherein the body port insert ring fits into a groove in the valve body, holding the resilient seat in place and is seal welded to the valve body at the periphery of the ring.

3. The gate valve according to claim 1 wherein the aperture extending down the strip comprises a semi-circular groove in the strip which matches with a semi-circular groove in a portion of the valve body adjacent the strip, the semi-circular groove in the portion of the valve body having a larger diameter than the semi-circular groove in the strip.

4. The gate valve according to claim 1 wherein the strip has a T-shaped cross section with a stem having an end face forming the resilient seat.

5. The gate valve according to claim 1 wherein the strip forming the resilient seat extends on both sides through the gate blade slot in a portion of the valve body holding the gate blade to a packing gland.

* * * * *